(12) United States Patent
Fujita et al.

(10) Patent No.: US 12,528,074 B2
(45) Date of Patent: Jan. 20, 2026

(54) CATALYST MATERIAL

(71) Applicants: Cataler Corporation, Kakegawa (JP);
National University Corporation Tokai National Higher Education and Research System, Nagoya (JP)

(72) Inventors: Naoto Fujita, Kakegawa (JP); Mai Huong Tran, Kakegawa (JP); Keiichi Narita, Kakegawa (JP); Norihiko Aono, Kakegawa (JP); Atsushi Satsuma, Nagoya (JP)

(73) Assignees: Cataler Corporation, Kakegawa (JP); National University Corporation Tokai National Higher Education and Research System, Nagoya (JP)

( * ) Notice: Subject to any disclaimer, the term of this patent is extended or adjusted under 35 U.S.C. 154(b) by 815 days.

(21) Appl. No.: 17/441,318

(22) PCT Filed: Mar. 27, 2020

(86) PCT No.: PCT/JP2020/014189
§ 371 (c)(1),
(2) Date: Sep. 21, 2021

(87) PCT Pub. No.: WO2020/203838
PCT Pub. Date: Oct. 8, 2020

(65) Prior Publication Data
US 2022/0176351 A1  Jun. 9, 2022

(30) Foreign Application Priority Data

Mar. 29, 2019 (JP) .................................. 2019-067927

(51) Int. Cl.
*B01J 23/44* (2006.01)
*B01D 53/94* (2006.01)
(Continued)

(52) U.S. Cl.
CPC .............. *B01J 23/44* (2013.01); *B01D 53/94* (2013.01); *B01J 21/04* (2013.01); *B01J 35/393* (2024.01);
(Continued)

(58) Field of Classification Search
None
See application file for complete search history.

(56) References Cited

U.S. PATENT DOCUMENTS 3,894,963 A   7/1975  Gerdes et al.
4,123,391 A   10/1978 Noguchi et al.
(Continued)

FOREIGN PATENT DOCUMENTS

CN   1221653 A   7/1999
CN   1524310 A   8/2004
(Continued)

OTHER PUBLICATIONS

Nomura et al. JP11169728A—translated document (Year: 1999).*
(Continued)

*Primary Examiner* — Jelitza M Perez
(74) *Attorney, Agent, or Firm* — Young Basile Hanlon & MacFarlane, P.C.

(57) ABSTRACT

The present invention provides an exhaust gas purification catalyst having an excellent purification performance for purifying chemically stable methane. A catalyst material 30 includes a carrier 32 formed of alumina and a catalyst 34 formed of at least one of palladium and a palladium oxide directly supported on the carrier 32. A specific surface area of the carrier 32 is preferably 20 m²/g or more 90 m²/g or less. In one preferred aspect, a proportion of Pd(100) and PdO(101) in crystal planes of the catalyst 34 at a joint surface between the catalyst 34 and the carrier 32 is 20 number % or more.

14 Claims, 5 Drawing Sheets

(51) Int. Cl.
  *B01J 21/04* (2006.01)
  *B01J 35/30* (2024.01)
  *B01J 35/45* (2024.01)
  *B01J 35/61* (2024.01)
  *F01N 3/10* (2006.01)
  *F01N 3/28* (2006.01)

(52) U.S. Cl.
  CPC .............. *B01J 35/45* (2024.01); *B01J 35/613* (2024.01); *F01N 3/103* (2013.01); *F01N 3/2825* (2013.01); *B01D 2255/1023* (2013.01); *B01D 2255/92* (2013.01); *B01J 2235/00* (2024.01); *B01J 2235/15* (2024.01); *B01J 2235/30* (2024.01); *F01N 2330/06* (2013.01); *F01N 2370/02* (2013.01)

(56) References Cited

U.S. PATENT DOCUMENTS

| | | | |
|---|---|---|---|
| 4,341,912 | A | 7/1982 | Takahashi et al. |
| 4,793,797 | A | 12/1988 | Kato et al. |
| 4,868,149 | A | 9/1989 | Bricker |
| 4,906,176 | A | 3/1990 | Yamashita et al. |
| 4,960,574 | A | 10/1990 | Bricker |
| 5,179,060 | A | 1/1993 | Subramanian et al. |
| 5,494,878 | A | 2/1996 | Murakami et al. |
| 5,895,636 | A | 4/1999 | Nguyen et al. |
| 6,084,140 | A | 7/2000 | Kitamura et al. |
| 6,143,691 | A | 11/2000 | Shiraishi et al. |
| 6,239,064 | B1 | 5/2001 | Nguyen et al. |
| 6,497,851 | B1 | 12/2002 | Hu et al. |
| 6,576,586 | B2 | 6/2003 | Siqin et al. |
| 6,710,615 | B2 | 3/2004 | Miki |
| 6,919,065 | B2 | 7/2005 | Zhou et al. |
| 7,115,236 | B2 | 10/2006 | Sekiba et al. |
| 7,572,422 | B2 | 8/2009 | Sekiba et al. |
| 8,211,823 | B2 | 7/2012 | Liang et al. |
| 8,580,706 | B2 | 11/2013 | Matsueda et al. |
| 2002/0035033 | A1 | 3/2002 | Muller et al. |
| 2017/0014806 | A1 | 1/2017 | Harada et al. |
| 2018/0021756 | A1 | 1/2018 | Karpov et al. |
| 2019/0120104 | A1* | 4/2019 | Inoda ............... B01J 23/44 |
| 2020/0232362 | A1* | 7/2020 | Liu ............... F01N 3/101 |
| 2020/0276568 | A1* | 9/2020 | Makino ............... B01J 35/30 |
| 2020/0360901 | A1* | 11/2020 | Onuki ............... B01J 21/066 |

FOREIGN PATENT DOCUMENTS

| | | | |
|---|---|---|---|
| CN | 103203233 | A | 7/2013 |
| CN | 103801290 | A | 5/2014 |
| CN | 104888804 | A | 9/2015 |
| CN | 105813735 | A | 7/2016 |
| JP | S54136589 | A | 10/1979 |
| JP | H03186347 | A | 8/1991 |
| JP | H11137998 | A | 5/1999 |
| JP | 11169728 | A * | 6/1999 |
| JP | H11169728 | A | 6/1999 |
| JP | 2001190931 | A | 7/2001 |
| JP | 2002166172 | A | 6/2002 |
| JP | 2002263491 | A | 9/2002 |
| JP | 2002336655 | A | 11/2002 |
| JP | 2003071288 | A | 3/2003 |
| JP | 2005007343 | A | 1/2005 |
| JP | 2005193110 | A | 7/2005 |
| JP | 2008246473 | A | 10/2008 |
| JP | 2010227873 | A * | 10/2010 |
| JP | 2012081458 | A * | 4/2012 |
| JP | 2014091119 | A | 5/2014 |
| JP | 2015073936 | A | 4/2015 |
| JP | 2018510767 | A | 4/2018 |
| WO | 2016139283 | A1 | 9/2016 |
| WO | 2017079826 | A1 | 5/2017 |

OTHER PUBLICATIONS

Fujita et al. JP2012-081458A—translated document (Year: 2012).*
Methane Combustion Activity of Pd Catalyst Supported on Alumina with Different Crystal Phases. 118th CATSJ Meeting—Meeting A Proceedings. Catalysis Society of Japan. ISSN 1343-9936. (Year: 2016).*
Hirai et al. JP2010227873A—translated document (Year: 2010).*
Demoulin, Olivier et al. "Combustion of methane, ethane and propane and of mixtures of methane with ethane or propane on Pd/g—Al2O3 catalysts". Applied Catalysis A: General. 344. 1-9. (2008) 10.1016/j.apcata.2008.03.026.
Chinese Office Action, dated Feb. 25, 2023 (7 pages).
Murata, Kazumasa et al. "The Metal-Support Interaction Concerning the Particle Size Effect of Pd/Al2 O3 on Methane Combustion." Angewandte Chemie (International ed. in English) vol. 56,50 (2017): 15993-15997. doi: 10.1002/anie.201709124.
Third Office Action issued in Chinese Application No. 202080026283.0 dated Jan. 17, 2024.
Alumina Product Data Book, Sumitomo Chemical Inorganic Material Operation Division, Sumika-alchem.Co.Jp/products/pdf/Almina_Products_Data_Book.Pdf.
Office Action issued in Chinese Application No. CN202080026283.0 dated Aug. 4, 2023.
Murata et al., "Methane Combustion Activity of Pd Catalyst Supported on Alumnina with Different Crystal Phases" (118th CATSJ Meeting Meeting A Proceedings), p. 252, 3D21.
Ozawa et al., "Deactivation of Pt PdO/Al2O3 in Catalystic Combustion of Methane", Applied Catalysis A General vol. 259, pp. 1-7.
Lyubovsky et al., "Pd on Low-Surface Area a—Alumina System: Is Metallic Pd Active for Methane Combustion?", Twenty-Sixth Symposium (International) on Combustion, vol. 26, pp. 1779-1787.
International Search Report PCT Application No. PCT/JP2020/014189, mailed Jun. 30, 2020 (4 pages).
International Preliminary Report on Patentability in PCT/JP2020/014189, mailed Oct. 14, 2021.
Extended European Search Report, mailed Apr. 23, 2022.
Indonesian Office Action, mailed Oct. 10, 2022.
Japanese Office Action, mailed Feb. 2, 2023.
Indonesian Office Action in P00202109290, dated Jun. 20, 2024 (3 pages).
European Office Action in EP 20782718.9, dated Jul. 31, 2024 (6 pages).

* cited by examiner

FIG.8

CATALYST MATERIAL

CROSS REFERENCE TO RELATED APPLICATIONS

This application is a 371 application of International Application no. PCT/JP2020/014189, filed Mar. 27, 2020, which claims priority to Japanese Patent Application no. 2019-067927, filed Mar. 29, 2019, the contents of which are incorporated herein by reference.

TECHNICAL FIELD

The present invention relates to a catalyst material used for purifying exhaust gas containing methane.

BACKGROUND ART

Exhaust gas emitted from internal combustion engines (engines) of vehicles, such as automobiles or the like, contains harmful gaseous components, such as hydrocarbon (HC), carbon monoxide (CO), nitrogen oxide ($NO_x$), or the like, as well as a particulate matter (PM) which is mainly composed of carbon. Exhaust gas regulations that control emissions of these harmful gases and PM are being tightened every year. Therefore, research is being conducted on internal combustion engines and related technologies to reduce emissions of harmful gases and PM from vehicles or the like.

Because of their low $CO_2$ emissions per unit distance, vehicles using natural gas internal combustion engines (for example, CNG vehicles) that use natural gas as fuel have attracted attention in recent years. While HC emitted from gasoline internal combustion engines that use gasoline as fuel are aromatics, olefins, paraffins, or the like that are components easily burned at relatively low temperature, HC emitted from natural gas internal combustion engines are mostly methane ($CH_4$) that is chemically stable and difficult to decompose at low temperature. Known technologies for catalysts used for purifying methane contained in exhaust gas of such natural gas internal combustion engines include, for example, Patent Documents 1 to 5.

CITATION LIST

Patent Document

PATENT DOCUMENT 1: Japanese Laid-open Patent Publication No. 2002-336655
PATENT DOCUMENT 2: Japanese Laid-open Patent Publication No. 2002-263491
PATENT DOCUMENT 3: Japanese Laid-open Patent Publication No. 2001-190931
PATENT DOCUMENT 4: Japanese Laid-open Patent Publication No. 2008-246473
PATENT DOCUMENT 5: Japanese Laid-open Patent Publication No. 2014-091119

SUMMARY OF THE INVENTION

Incidentally, it is when an exhaust gas purification catalyst has been warmed up to temperature at which the catalyst is activated by exhaust gas that the exhaust gas purification catalyst functions. Therefore, it is difficult to purify methane in the exhaust gas during cold start-up of an internal combustion engine, and there is a risk that unpurified methane is released into the atmosphere. Although natural gas internal combustion engines that use natural gas as fuel emit a low amount of $CO_2$ per unit distance, 80 mass % or more of HC in the exhaust gas is methane, and this can be a significant problem in a point that methane has a high global warming potential, that is, a global warming potential 25 times higher than that of $CO_2$.

In view of the foregoing, the present invention has been devised and it is therefore an object of the present invention to provide an exhaust gas purification catalyst having an excellent purification performance for purifying chemically stable methane.

The present invention provides a catalyst material used for purifying methane. The catalyst material includes a carrier formed of alumina and a catalyst formed of at least one of palladium and a palladium oxide directly supported by the carrier. A specific surface area of the carrier is 20 $m^2/g$ or more and 90 $m^2/g$ or less.

According to the above-described structure, the specific surface area of alumina that is the catalyst carrier is limited to a specific range. For alumina having the above-described specific surface area, each of crystal structures of palladium and a palladium oxide that are crystally grown and supported directly on a surface thereof can be made into a crystal structure in which a specific crystal orientation is high. As a result, for example, 50% methane purification temperature of palladium and the palladium oxide that are catalysts can be lowered and a methane purification performance of the catalyst material can be increased.

In one preferred aspect of the catalyst material provided by the technology disclosed herein, a proportion of Pd(100) and PdO(101) in crystal planes of the catalyst at a joint surface between the catalyst and the carrier is 20 number % or more. According to the above-described structure, the methane purification performance can be preferably increased more reliably.

In one preferred aspect of the catalyst material provided by the technology disclosed herein, a proportion of θ(001), θ(111), and α(104) in crystal planes of the carrier at a joint surface between the catalyst and the carrier is 30 number % or more. According to the above-described structure, the proportion of Pd(100) and PdO(101) of the catalyst at the joint surface can be increased, and consequently, a catalyst material having an excellent methane purification performance can be preferably obtained.

In one preferred aspect of the catalyst material provided by the technology disclosed herein, an average particle diameter of the catalyst is 20 nm or less. According to the above-described structure, a contact efficiency of the catalyst with methane gas per unit mass can be preferably increased. Furthermore, it is preferable that the average particle diameter of the catalyst is 10 nm or less because a catalyst activity is further increased due to a sizing effect.

In one preferred aspect of the catalyst material provided by the technology disclosed herein, a supported ratio of the catalyst to a total amount of the carrier and the catalyst is 10 mass % or less. The catalyst material disclosed herein can exhibit a high methane purification performance with a smaller catalyst amount. Therefore, in a case where the supported ratio of the catalyst is made 10 mass % or less, particularly, the above-described effects can be preferably exhibited in a clear manner.

In one preferred aspect of the catalyst material provided by the technology disclosed herein, the catalyst material is used for purifying exhaust gas emitted from an internal combustion engine using natural gas as fuel. In a case where the internal combustion engine uses natural gas as fuel, 80 mass % or more of HC contained in the exhaust gas can be methane. The exhaust gas purification catalyst of the technology disclosed herein preferably exhibits the above-described effects in a case where the exhaust gas purification catalyst is used for purifying the exhaust gas having a high content of methane.

As has been described above, the catalyst material disclosed herein has an excellent methane purification performance, and for example, the purification rate for methane in gas can be made 50% or more in a lower temperature range. This feature is preferable because, when the catalyst material is preferably used for purifying methane contained in exhaust gas at relatively low temperature, for example, during cold start-up of the internal combustion engine, during idling stop control, or the like, advantages thereof can be fully exhibited. Therefore, the catalyst material can be preferably used as a catalyst material in an exhaust gas purification catalyst body for, for example, a natural gas (CNG) engine, a gasoline engine, a diesel engine, or the like. The catalyst material can be preferably used in a case where the internal combustion engine is an internal combustion engine of a vehicle (including a hybrid vehicle, a plug-in hybrid vehicle, or the like including a driving power source, in addition to an engine vehicle) with relatively large fluctuations in rotation speed. It is particularly preferable to use the catalyst material as a catalyst material of an exhaust gas purification catalyst body of a CNG engine in which a proportion of methane in HC contained in exhaust gas is high.

DESCRIPTION OF EMBODIMENTS

Preferred embodiments of the present invention will be described below with reference to the accompanying drawings. Note that matters other than matters specifically mentioned in this specification and necessary for the implementation of the present invention can be understood as design matters carried out by those skilled in the art, based on the conventional art in the field. The present invention can be implemented based on the contents disclosed in this specification and the common general technical knowledge in the field. Moreover, in the following drawings, members/parts that have the same effect may be denoted by the same sign and the overlapping description may be omitted or simplified. Dimensional relations (length, width, thickness, or the like) in the drawings do not necessarily reflect actual dimensional relations. Note that, in this specification, the notation "A to B" indicating a numerical range means "A or more and B or less."

Figure 1:
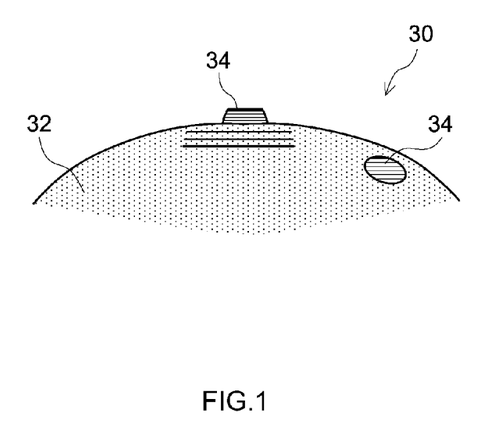
FIG. 1 is a partial cross-sectional view schematically illustrating a structure of a catalyst body according to one embodiment.

FIG. 1 is a cross-sectional view illustrating a structure of a catalyst material 30 according to one embodiment. The catalyst material 30 disclosed herein is a catalyst material used for purifying methane. The catalyst material 30 includes a carrier 32 and a catalyst 34 directly supported by the carrier 32. Constituent components of the catalyst material 30 will be described below.

In the catalyst material 30 disclosed herein, the carrier 32 that supports the catalyst 34 is formed of alumina. There is no particular limitation on a crystal structure of alumina. Various polymorphic forms of alumina, such as γ-alumina, δ-alumina, θ-alumina, α-alumina, or the like, are known, and the crystal structure of alumina as the carrier 32 may include one or two or more of the above-described polymorphic forms. Alumina other than α-alumina of a high temperature stable phase is referred to as transition alumina (also referred to as intermediate alumina), generally has ultra-fine primary particles, and has a large specific surface area. As an alumina carrier of a known catalyst for automobiles, in general, an intermediate alumina, that is, a γ-alumina having a particularly high specific surface area has been widely used. On the other hand, according to a study conducted by the present inventors, alumina as the carrier 32 preferably has a relatively small specific surface area, that is, a specific surface area of 90 $m^2/g$ or less (for example, 20 $m^2/g$ or more and 90 $m^2/g$ or less).

Although there is no unambiguous relationship between a specific surface area of a crystal and a crystal plane appearing on a surface of the crystal, according to the study of the inventors, it was found that there is a certain degree of correlation between the specific surface area of alumina and the crystal plane appearing on the surface thereof. The inventors found that, in alumina having such a specific surface area, a special crystal plane on which the catalyst 34 can be easily grown in a preferable external form is exposed on the surface thereof at a high proportion. Such special crystal planes of alumina (which will be occasionally hereinafter referred to simply as "the specific planes of alumina" or the like) are θ(001), θ(111), and α(104) of alumina. By using such alumina as a carrier, generation of the catalyst 34 having a specific crystal orientation on a surface thereof can be promoted, for example, in a method for manufacturing the catalyst material 30 described later, and therefore, use of such alumina as a carrier is preferable.

The specific surface area of alumina serving as the carrier 32 is appropriately 90 $m^2$ or less, preferably 85 $m^2/g$ or less, and may be 80 $m^2/g$ or less or 75 $m^2/g$ or less, that is, for example, 60 $m^2/g$ or less in view of increasing a proportion at which the crystal plane on which the catalyst 34 in a preferable external form can be easily grown is exposed on the surface thereof. However, it is not preferable that the specific surface area of alumina serving as the carrier 32 is too small because a proportion of flat surfaces, that is, in other words, the specific crystal planes, in the external form of alumina becomes excessively high and the carried catalyst 34 tends to grow coarsely when the carried catalyst 34 is generated or when the catalyst material is used. In view of the foregoing, the specific surface area is, for example, appropriately 15 m$^2$/g or more, preferably 20 m$^2$/g or more, and may be 25 m$^2$/g or more, 30 m$^2$/g or more (for example, more than 30 m$^2$/g), or 35 m$^2$/g or more, that is, for example, 40 m$^2$/g or more.

If the carrier 32 has the above-described specific surface area, there is no particular limitation on a shape of the carrier 32. As one preferable example, the carrier 32 may be formed of powdered alumina and/or porous alumina. In a case where the carrier 32 is powdered alumina, an average particle diameter of the carrier 32 is, for example, preferably 20 μm or less, typically 10 μm or less, or 7 μm or less, that is, for example, 5 μm or less. Moreover, the average particle diameter of the carrier 32 may be typically 0.1 μm or more, that is, for example, 0.5 μm or more, 1 μm or more, or 3 μm or more in view of increasing a heat resistance of the catalyst material 30.

Note that, in this specification, the average particle diameter of a material that is the catalyst material 30, the carrier 32, or the like and is in a form of powder is cumulative 50% particle diameter ($D_{50}$) in a volume-based particle diameter distribution measured by a laser diffraction scattering method.

Moreover, the specific surface area of the carrier 32 is a value calculated by a BET method (for example, a BET one-point method), based on an amount of gas absorbed measured by a gas absorption method (a constant capacity adsorption method). There is no particular limitation on an adsorbate in the gas absorption method and, for example, nitrogen ($N_2$) gas can be preferably used.

In the catalyst material 30 disclosed herein, the catalyst 34 is formed of at least one of palladium and a palladium oxide. The catalyst 34 is supported directly and integrally on a surface of alumina serving as the carrier 32. In other words, the catalyst 34 is bonded to the surface of the carrier 32 without a binding agent, such as a binder or the like. For example, specifically, the catalyst 34 is supported on the surface of alumina serving as the carrier through crystal growth directly thereon. At this time, the catalyst 34 crystally grows on the surface of alumina and, when the crystal plane of alumna serving as the carrier 32 is the above-described specific plane, crystal growth of the catalyst 34 with a certain crystal orientation relationship with the specific plane of alumina tends to be induced. Crystal planes of palladium (Pd) and a palladium oxide (PdO) whose growth tends to be induced on the specific plane of alumina are Pd(100) and PdO(101) (which will be hereinafter occasionally referred to as simply "the palladium specific planes"). In other words, Pd tends to grow in a (100) plane orientation on the specific plane of alumina serving as the carrier 32. Alternatively, PdO tends to grow in a (101) plane orientation. As for Pd and PdO, for example, Pd is easily oxidized into PdO and PdO is easily reduced to Pd by reversible change of an electronic state of Pd due to fluctuations of an atmosphere of exhaust gas. In this oxidation-reduction reaction of Pd and PdO, Pd(100) and PdO(101) are equivalent planes and Pd and PdO can be equally treated in the catalyst 34 disclosed herein. In the catalyst 34 disclosed herein, a valence number of Pd in a palladium oxide may be a value larger than +2 (for example, a value of about +2 to +3).

As described above, palladium (Pd) and a palladium oxide (PdO) as the catalyst 34 tend to epitaxially grow on the above-described specific plane of alumina serving as the carrier 32. Based on this, the catalyst material disclosed herein has a structure in which the carrier 32 and the catalyst 34 are plane-oriented at a high proportion, as illustrated in FIG. 1. For example, a proportion of the specific planes of palladium in the crystal planes of the catalyst 34 at a joint surface of the catalyst 34 with the carrier 32 can be 20 number % or more. Based on the study of the present inventors, it was confirmed that, as the proportion of the specific planes of palladium is increased as described above, a methane purification performance of the catalyst material 30 is increased. Although details are not clear, it can be considered that, due to oriented growth of Pd and PdO serving as the catalyst 34, a specific crystal plane, a growth step, or the like is formed in a crystal external form of the catalyst 34 and this provides an active point in a methane purification reaction.

As for the proportion of the specific planes of palladium at a catalyst-carrier interface of the catalyst material 30, as the proportion increases, for example, 50% methane purification temperature reduces or the like, so that the methane purification performance is increased. The proportion of the specific planes of palladium is preferably 20 number % or more, more preferably 25 number % or more, and may be, for example, 30 number % or more, 35 number % or more, 40 number % or more, or the like. There is no particular limitation on an upper limit of the proportion of the specific planes of palladium at the catalyst-carrier interface, and the upper limit may be substantially 100 number % or less (for example, 100 number %) and may be, for example, 95 number % or less, 90 number % or less, 85 number % or less, 80 number % or less, 70 number % or less, or the like.

Note that, herein, as described above, growth of the specific planes of palladium at the catalyst-carrier interface can be induced by the specific planes of alumina. In view of this, in the crystal planes of alumina forming the catalyst-carrier interface, a proportion of the specific planes of alumina is preferably large. Accordingly, the proportion of the specific planes of alumina at the interface is preferably 30 number % or more, more preferably 32 number % or more, and may be, for example, 35 number % or more. There is no particular limitation on an upper limit of the proportion of the specific planes of palladium at the catalyst-carrier interface, and the upper limit may be 100 number % or less (for example, 100 number %) and may be substantially 50 number % or less and 45 number % or less, that is, for example, about 40 number % or less or the like.

Note that, in the technology disclosed herein, the crystal planes forming the interface between the catalyst 34 and the carrier 32 can be specified by a known method by observation using a transmission electro microscope (TEM). In one example, a crystal structure image or a crystal photon image at the interface between the catalyst 34 and the carrier 32 may be obtained and the crystal planes forming the interface may be identified for each of the catalyst 34 and the carrier 32. Identification of the crystal planes may be performed based on a known crystal plane spacing (lattice spacing), the crystal planes may be identified using an electron diffraction observation mode of TEM. In this specification, as described in examples below, the crystal planes are identified based on the crystal plane spacing.

Note that sizes of palladium (Pd) and a palladium oxide (PdO) serving as the catalyst 34 are not strictly limited. In view of cost cut or the like, the catalyst 34 may be a particulate catalyst (which will be hereinafter referred to as catalyst particles or the like) having a large specific surface area and, for example, 90 number % or more of the catalyst particles preferably have a particle diameter of about 20 nm or less that exhibits a sizing effect. An average particle diameter of the catalyst particles may be, for example, 15 nm or less, more preferably 10 nm or less, and typically 8 nm or less or 7 nm or more. There is no particular limitation on a lower limit on the average particle diameter of the catalyst particles, and the lower limit is typically approximately 0.1 nm or more and may be, for example, 1 nm or more.

Note that the average particle diameter of the catalyst particles is a value (volume sphere equivalent diameter) calculated by a pulse absorption method using carbon monoxide (CO) as an absorption gas. The pulse absorption method was performed in accordance with "a metal surface area measuring method using a CO pulse method" by the Reference Catalyst Division, of the Catalysis Society of Japan.

In the catalyst material 30 disclosed herein, there is no particular limitation on a supported amount of the catalyst 34 supported, but when the supported amount of the catalyst 34 supported is too small, a catalyst activity achieved by the catalyst 34 is insufficient, and therefore, it is not preferable that the supported amount of the catalyst 34 is too small. As one example, as the supported amount of the catalyst 34 that is preferable as an exhaust gas purification catalyst, for example, a proportion (supported amount) of the catalyst 34 to a total mass of the catalyst material 30 is appropriately 0.001 mass % or more, preferably 0.01 mass % or more, and may be, for example, 0.1 mass % or more. On the other hand, when the supported amount of the catalyst 34 is too large, particle growth of the catalyst 34 tends to be induced and the too large supported amount of the catalyst 34 is disadvantageous in terms of cost. Therefore, the proportion of the catalyst 34 to the total mass of the catalyst material 30 may be, for example, 10 mass % of less, is preferably 8 mass % or less, and typically may be 5 mass % or less.

The above-described catalyst material 30 can be obtained by integrally forming and supporting palladium or a palladium oxide on a surface of alumina serving as the carrier 32 such that a proportion of Pd(100) or PdO(101) at a joint surface (crystal interface) is large. As a method for manufacturing the catalyst material 30, as one preferred example, for example, the catalyst material 30 can be prepared by, after immersing the carrier 32 in an aqueous solution containing a salt (for example, nitrate) or a complex (for example, tetraammine complex) containing a palladium component that is the catalyst 34, drying and baking the carrier 32, although the method is not limited thereto. At this time, by using alumina having the above-described specific surface area as the carrier 32, the catalyst material 30 in which the proportion of the specific planes of palladium at the interface is large can be obtained.

The above-described catalyst material 30 is provided as a catalyst material having an excellent methane purification performance. Accordingly, the catalyst material 30 can be preferably used, for example, as a purification catalyst or the like used for purifying exhaust gas of internal combustion engines using natural gas as fuel. An exhaust gas purification system using the catalyst material 30 will be briefly described below.

Figure 2:
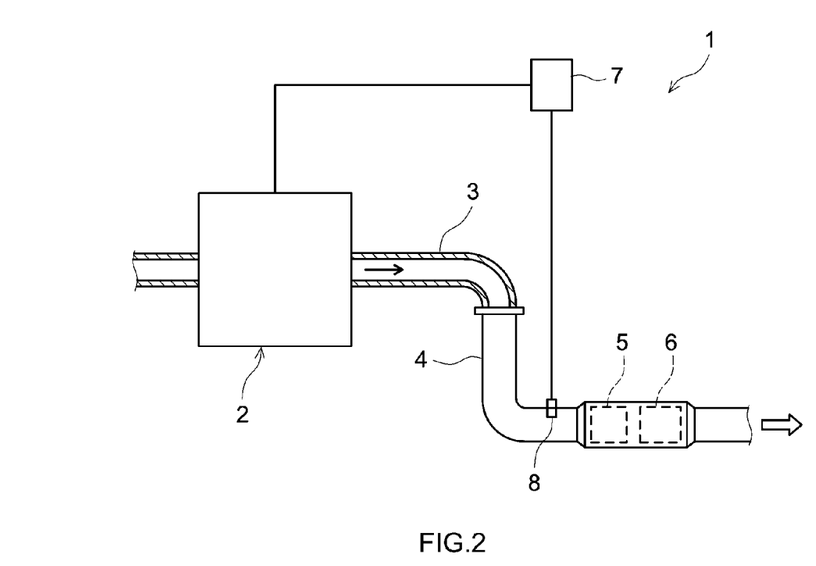
FIG. 2 is a schematic view illustrating a configuration of an exhaust gas purification system according to one embodiment.

FIG. 2 is a schematic view illustrating an exhaust gas purification system 1 according to one embodiment. The exhaust gas purification system 1 purifies harmful components, that is, for example, HC, CO, and $NO_x$, contained in exhaust gas emitted from an internal combustion engine 2 and collects PM contained in the exhaust gas. The exhaust gas purification system 1 includes the internal combustion engine 2 and an exhaust passage. The exhaust gas purification system 1 of this embodiment includes the internal combustion engine 2, the exhaust passage, an engine control unit (ECU) 7, and a sensor 8. The exhaust gas purification catalyst in this technology is provided in the exhaust passage of the internal combustion engine 2 as one constituent component of the exhaust gas purification system 1. The exhaust gas circulates in the exhaust passage. Arrows in FIG. 2 indicate an exhaust gas flow direction. Note that, in this specification, along a flow of the exhaust gas, a side closer to the internal combustion engine 2 is an upstream side and a side farther from the internal combustion engine 2 is a downstream side.

An air-fuel mixture containing oxygen and fuel gas is supplied to the internal combustion engine 2. The internal combustion engine 2 converts thermal energy generated by burning the air-fuel mixture to kinetic energy. A ratio between oxygen and the fuel gas supplied to the internal combustion engine 2 is controlled by ECU 7. The burned air-fuel mixture becomes exhaust gas and thus is discharged to the exhaust passage. The internal combustion engine 2 having the structure of FIG. 1 is mainly constituted by an internal combustion engine using natural gas as fuel.

The internal combustion engine 2 is coupled to the exhaust passage at an unillustrated exhaust port. The exhaust passage of this embodiment is constituted by an exhaust manifold 3 and an exhaust pipe 4. The internal combustion engine 2 is coupled to the exhaust pipe 4 via the exhaust manifold 3. Typically, the exhaust passage includes a catalyst body 5 and a filter body 6. For example, the catalyst body 5 includes a catalyst body according to the technology disclosed herein. For example, the catalyst body 5 may include some other catalyst, such as a binary catalyst, an HC selective reduction type NOx catalyst, a NOx storage reduction catalyst, a urea selective reduction type NOx catalyst, or the like. The filter body 6 is not an essential component and the exhaust passage may include the filter body 6 as necessary. In a case where the exhaust passage incudes the filter body 6, a structure thereof may be similar to a known structure and there is no particular limitation thereon. The filter body 6 may be, for example, a particulate filter (PF) that supplements fine PMs to reduce the number of the fine PMs discharged, a catalyst particulate filter or the like configured to have a catalyst purification function by causing the particulate filter to support a binary or ternary catalyst or the like, or the like. Note that the catalyst material 30 disclosed herein can be used as the catalyst in the catalyst particulate filter. An arrangement of the catalyst body 5 and the filter body 6 is arbitrarily variable, and one or more of each of the catalyst body 5 and the filter body 6 may be independently provided.

The ECU 7 is electrically coupled to the internal combustion engine 2 and the sensor 8. The ECU 7 receives signals from various sensors (for example, an oxygen sensor, a temperature sensor, a pressure sensor) 8 that detect an operation state of the internal combustion engine 2 and controls driving of the internal combustion engine 2. A configuration of the ECU 7 may be similar to a known configuration, and there is no particular limitation thereon. The ECU 7 is, for example, a processor or an integrated circuit. The ECU 26 receives, for example, information of an operation state of a vehicle or the like, an amount, temperature, and a pressure of exhaust gas emitted from the internal combustion engine 2, or the like. Moreover, the ECU 7 performs operation control, such as fuel injection control, ignition control, intake air amount adjustment control, or the like, for the internal combustion engine 2, for example, in accordance with the received information.

Figure 3A:
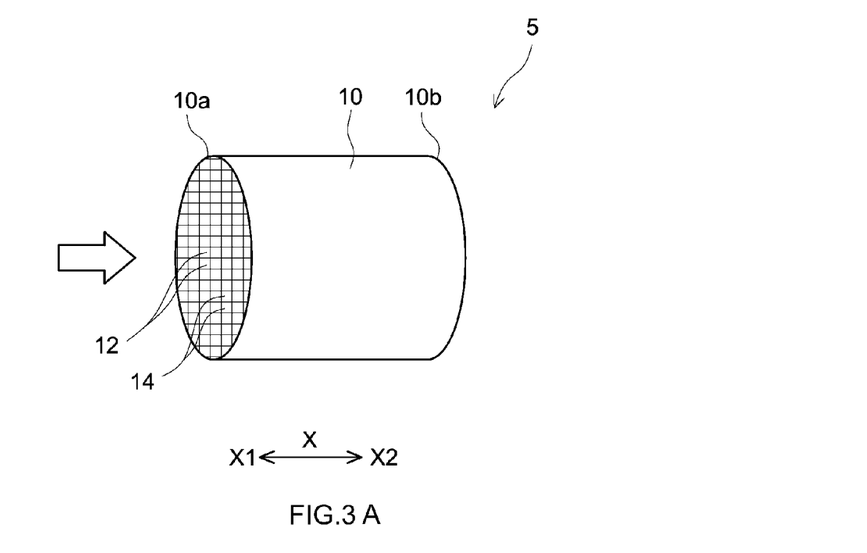
FIG. 3A is a perspective view schematically illustrating an exhaust gas purification catalyst according to one embodiment.
Figure 3B:
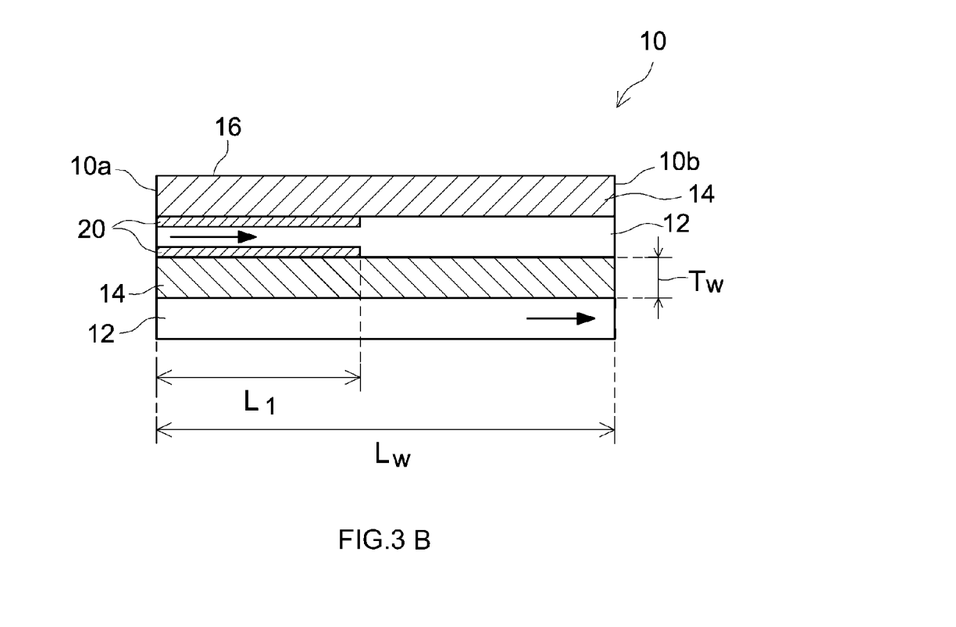
FIG. 3B is a partial cross-sectional view schematically illustrating a structure of a catalyst layer in the exhaust gas purification catalyst according to one embodiment.

FIG. 3A is a perspective view of a catalyst body 5 according to one embodiment. The reference character X in FIG. 2 indicates a first direction of the catalyst body 5. The catalyst body 5 is installed in the exhaust pipe 4 such that the first direction matches the exhaust gas flow direction. For convenience, when a focus is put on a flow of the exhaust gas, one direction X1 of the first direction X is referred to as an exhaust gas inflow side (upstream side) and the other direction X2 thereof is referred to as an exhaust gas outflow side (downstream side). For the catalyst body 5, occasionally, the one direction X1 is referred to as a front side and the other direction X2 is referred to as a rear side. FIG. 3B is a schematic view illustrating an enlarged portion of a cross section of the catalyst body 5 according to one embodiment taken along the first direction X. The catalyst body 5 disclosed herein includes, for example, a base material 10 having a straight flow structure and a catalyst layer 20. The base material 10 and the catalyst layer 20 will be described below in this order.

For the base material 10, known base materials made of various raw materials in various forms used for this kind of application can be used. The base material 10 typically has a so-called honeycomb structure. For the base material 10, for example, a base material formed of a material represented by ceramics, such as cordierite, aluminum titanate, silicon carbide (SiC), or the like, an alloy, such as stainless steel, or the like, having a high heat resistance and a high resistance to abrupt temperature change can be preferably employed. There is no particular limitation on an external form of the base material 10 and examples of the base material 10 include a base material having a columnar shape (this embodiment). However, as for an external form of an entire base material, in addition to a columnar shape, an elliptical columnar shape, a polygonal pillar shape, an amorphous shape, a pellet shape, or the like may be employed. In this embodiment, a column axis direction of the base material 10 having a columnar shape matches the first direction X. An end portion in the one direction X1 of the base material 10 is a first end portion 10a and an end portion in the other direction X2 is a second end portion 10b. In this embodiment, a dimension of a constituent component, such as the base material 10 or the like, along the first direction X is referred to as a length.

In the base material 10, cells (cavities) 12 in the honeycomb structure extend in the first direction X. The cells 12 are through holes that pass through the base material 10 in the first direction X and serve as a passage of exhaust gas. The base material 10 includes partition walls 14 that define the cells 12. There is no particular limitation on a shape of a cross section of the cell 12 orthogonal to the first direction X (which will be hereinafter referred as simply to a "cross section"), in other words, a structure of the partition wall 14 that defines the cell. The cell 12 may have various geometrical shapes, such as, for example a rectangular shape, such as a square, a parallelogram, a rectangle, a trapezoid, or the like, a triangular shape, other polygonal shapes (for example, a hexagon, an octagon), a circle, or the like. The shape, the size, the number, or the like of the cells 12 can be appropriately designed in consideration of a flow rate or components of exhaust gas supplied to the catalyst body 5.

The partition walls 14 face the cells 12 and each of the partition walls 14 partitions corresponding adjacent ones of the cells 12. A thickness (dimension in a direction orthogonal to a surface. The same applies below) Tw of the partition wall 14 is preferably small because, when the thickness Tw is small, a specific surface area of the base material 10 can be increased and reduction in weight and thermal capacity can be achieved. The thickness Tw of the partition wall 14 can be, for example, 1 mm or less, 0.75 mm or less, 0.5 mm or less, 0.1 mm or less, or the like. On the other hand, with the partition wall 14 having an appropriate thickness, strength and durability of the catalyst body 5 are increased. In view of the foregoing, the thickness Tw of the partition wall 14 may be, for example, 0.01 mm or more and 0.025 mm or more. There is no particular limitation on a length (entire length) Lw of the partition wall 14 in the X direction and the length may be generally 50 to 500 mm, that is, for example, about 100 to 200 mm. Note that, in this specification, a volume of the base material 10 is an apparent volume of the base material. Therefore, the volume of the base material 10 includes, in addition to a substantial volume of the honeycomb structure (including the partition walls 14) that is a framework, a cubic content of the cells 12.

As illustrated in FIG. 3B, the catalyst layer 20 is disposed on a surface of the partition wall 14. The catalyst layer 20 contains, as a palladium catalyst that is a noble metal catalyst, the catalyst material 30 disclosed herein. By forming a Pd layer of the catalyst body 5 using the catalyst material 30 provided by this technology, methane can be purified at temperature ranging from lower temperature, and thus, an amount of methane emission can be reduced. In other words, the catalyst body 5 having an excellent methane purification performance can be provided.

Note that the catalyst layer 20 may include some other noble metal catalyst with the palladium catalyst. Alternatively, the catalyst body 5 may include a catalyst layer containing unillustrated some other noble catalyst separately from the catalyst layer 20 (which will be hereinafter referred to as "the palladium (Pd) layer") containing the palladium catalyst. As the some other catalyst layer, a platinum (Pt) layer and a rhodium (Rh) layer can be considered. The Pt layer contains platinum (Pt) and an alloy mainly containing Pt as a noble metal catalyst. The Rh layer contains rhodium (Rh) and an alloy mainly containing Rh as a noble metal catalyst. Each of the catalyst layer 20 and the other catalyst layers may contain some other metal catalyst, in addition to the above-described noble metal catalysts. Examples of the metal catalyst include Rh, Pd, Pt, ruthenium (Ru), osmium (Os), iridium (Ir), platinum group catalysts that are alloys of the above-described metals, and, in addition to these platinum group elements or instead of the above-described platinum groups, metals including a metal element, such as, for example, iron (Fe), cobalt (Co), nickel (Ni), copper (Cu), silver (Ag), gold (Au), or the like or alloys thereof, or the like. However, each of the metal catalysts contained in the Pd layer, the Pt layer, and the Rh layer may be a corresponding one of Pd, Pt, and Rh in an amount of 80 mass % or more, preferably in an amount of 90 mass % or more, more preferably in an amount of 95 mass % or more, and particularly preferably in an amount of substantially 100 mass %. As a matter of course, it is allowed that some other metal catalyst inevitably mixed therein is contained therein.

Among the Pd layer, the Pt layer, and the Rh layer, the Pd layer and the Pt layer are highly active particularly as oxidation catalysts and exhibits, in the catalyst body 5, a high oxidation activity for CO and HC, in particular, among harmful components in the exhaust gas. The Rh layer is highly active particularly as a reduction catalyst and exhibits, in the catalyst body 5, a high reduction activity for NOx, in particular, among the harmful components in the exhaust gas. The catalyst body 5 includes the Pd layer, the Pt layer, and the Rh layer, and thus, has a function as a ternary catalyst. There is no particular limitation on an arrangement of the Pd layer, the Pt layer, and the Rh layer, but the Pd layer is more preferably arranged in a relatively front side (for example, an area extending from the first end portion 10a of the upstream side toward the downstream side) because, for example, the 50% methane purification temperature can be further reduced. The Pt layer is more preferably arranged in a relatively rear side (for example, an area extending from the second end portion 10b of the downstream side toward the upstream side). The Rh layer is more preferably arranged in a longer area along the first direction (for example, arranged so as to be stacked with the Pd layer and the Pt layer) in view of enhancing NOx purification performance.

Each of the Pt layer and the Rh layer can contain, in addition to a noble metal catalyst contained in each of the layers, a carrier that supports the catalysts. As the carrier, any carrier (typically powder) that has been known to be usable for this type of application conventionally can be appropriately employed. For example, preferable examples of the carrier include a metal oxide, such as alumina ($Al_2O_3$), a rare earth metal oxide, an alkali metal oxide, an alkaline earth metal oxide, ceria ($CeO_2$), zirconia ($ZrO_2$), silica ($SiO_2$), magnesia (MgO), titania ($TiO_2$), or the like, or a solid solution of each of these metal oxides, such as, for example, a ceria-zirconia composite oxide (CZ composite oxide: $CeO_2$—$ZrO_2$). One of the above-described metal oxides and the solid solutions may be used alone, and two or more of them may be used in combination. Among them, it is preferable to use at least one of alumina and a CZ composite oxide. The carrier may be a polycrystalline material or a monocrystalline material.

Each of the Pd layer, the Pt layer, and the Rh layer may appropriately contain an arbitrary component, in addition to the noble metal catalyst and the carrier of the noble metal catalyst. Examples of the arbitrary component include, for example, a promotor that does not support a metal catalyst, an oxygen storage material (OSC material: oxygen storage capacity) having an oxygen storage capacity, a $NO_x$ adsorbent having a $NO_x$ storage capacity, a stabilizer, or the like. Examples of the promotor include, for example, alumina or silica. Examples of the OSC material include, for example, ceria, or a ceria-containing composite oxide, that is, for example, a CZ composite oxide.

Examples of the stabilizer include, for example, a rare earth element, such as lanthanum (La), yttrium (Y), or the like, an alkaline earth element, such as calcium (Ca), barium (Ba), or the like, other transition metal elements, or the like. The above-described elements are typically present in the catalyst layer in a form of an oxide. Among them, a rare earth element, such as lanthanum, yttrium, or the like, is preferably used as the stabilizer because the rare earth element can increase a specific surface area at high temperature without interfering with a catalyst function. The carrier can be a polycrystalline material or a monocrystalline material. In the catalyst layer 20, the Pd layer containing an oxidation catalyst preferably contains the stabilizer, such as, for example, a barium element. Thus, poisoning of the oxidation catalyst is preferably suppressed and a catalyst activity can be improved. In addition, dispersibility of the oxidation catalyst is enhanced, and particle growth of the oxidation catalyst can be suppressed at a higher level.

There is no particular limitation on an amount of coating of each of the Pd layer, the Pt layer, and the Rh layer. In view of increasing circulation of the exhaust gas at the partition walls 14 to reduce pressure loss, the amount of coating may be generally 120 g/L or less, 100 g/L or less, and preferably 80 g/L or less, that is, for example, 70 g/L or less, for 1 L of the base material in terms of volume. In some aspects, the amount of coating may be, for example, 50 g/L or less, and typically 30 g/L or less. On the other hand, in view of further increasing an exhaust gas purification performance for methane and other exhaust gases, the amount of coating may be generally 5 g/L or more, preferably 10 g/L or more, that is, for example, 20 g/L or more, for 1 L of the base material in terms of volume. By satisfying the above range, both reduction in pressure loss and increase in exhaust gas purification performance can be achieved at a higher level. Note that the amount of coating for the catalyst layer 20 refers to a mass of the catalyst layer 20 contained in the base material per unit volume. However, the volume of the base material is considered only for a portion of the base material where the relevant catalyst layer 20 is formed along the first direction X, and not for the other portion of the base material where the relevant catalyst layer 20 is not formed.

There is no particular limitation on a thickness of each of the Pd layer, the Pt layer, and the Rh layer, and the thickness thereof can be appropriately designed in accordance with the size or the like of the cells 12 of the base material 10. As one example, the thickness of each of the Pd layer, Pt layer, and Rh layer is appropriately about 20 µm to 500 µm, independently, and is preferably, for example, about 50 µm to 200 µm.

Note that the catalyst body 5 having the above-described structure can be manufactured, for example, by the following method. First, the base material 10 and slurries used for forming the catalyst layer 20 are prepared. As the slurries, a slurry for forming a Pd layer, a slurry for forming a Pt layer, and a slurry for forming a Rh layer may be prepared. The slurries for forming the catalyst layers contain different metal catalyst components (typically a solution containing metal catalysts as ions) as essential components, and each of the slurries can contain other arbitrary components, such as, for example, a carrier, a promotor, an OSC material, a binder, various additives, or the like. Note that, as the binder, an alumina sol, a silica sol, or the like can be employed. Note that properties (viscosity, solid fraction, or the like) of each of the slurries may be appropriately adjusted depending on the size of the base material 10 to be used, the form of the cells 12 (partition walls 14), desired properties of the catalyst layer 20, or the like.

For example, an average particle diameter of particles in the slurries can be approximately 0.3 µm or more, preferably 0.4 µm or more, more preferably 0.5 µm or more, and can be approximately 3 µm or less, preferably 1 µm or less, and more preferably 0.7 µm or less. Moreover, generally, for example, the slurries for forming the catalyst layers may be prepared such that a viscosity η400 at temperature of 25° C. and a shear rate of 400 $s^{-1}$ is 50 mPa·s or more and 150 mPa·s or less and preferably about 60 mPa·s or more and 110 mPa·s or less. Note that the above-described slurry viscosity is a viscosity measured under a temperature environment of 25° C. using a commercially available shear viscometer.

Next, the prepared slurries for forming the catalyst layers are fed into the cells 12 from an end portion of the base material 10 to flow in up to a predetermined length along the X direction. In a case of forming the Pd layer, the slurry may be fed from the first end portion 10a to flow in up to the length L1 in the X2 direction. In a case of forming the Pt layer, the slurry is fed from the second end portion 10b to flow in up to a predetermined length in the X1 direction. In a case of forming the Rh layer, the slurry may be fed from either the first end portion 10a or the second end portion 10b, and may be fed to flow up to a desired length. At this point, the slurry may be sucked from an end portion at an opposite end. The excessive slurry may also be discharged by blowing air from the end portion at the opposite side. At this time, suction speed and/or blowing speed depends on the viscosity of the slurry, but is generally 10 to 100 m/s, preferably 10 to 80 m/s, and may be, for example, 50 m/s or less. Thereafter, each time one slurry is supplied, the base material 10 supplied with the slurry is dried and baked at predetermined temperature for a predetermined time. Thus, particulate raw materials are sintered, thereby forming a porous catalyst layer 20. A similar method for drying and baking to those used for forming a known catalyst layer may be used. Thus, the catalyst layer 20 can be formed on a surface of the partition wall 14 of the base material 10.

According to the catalyst body 5 having the above-described structure, the exhaust gas emitted from the internal combustion engine 2 flows in the cells 12 from the first end portion 10a of the base material 10. The exhaust gas that has flowed in the cells 12 passes through the catalyst layer 20 formed on the surface of the partition wall 14 and is discharged from the second end portion 10b. Herein, for example, the Pd layer is disposed in the upstream side of the catalyst layer 20. The Pd layer contains the catalyst material 30 disclosed herein. For example, the catalyst material 30 can cause the 50% methane purification temperature to be lower than 360° C. and has an excellent low temperature purification performance. Therefore, even in a case where the exhaust gas contains methane as HC and the temperature of the exhaust gas tends to be lowered by, for example, F/C control, or the like, the catalyst body 5 can purify a larger amount of methane at lower temperature than that in a known technology. The exhaust gas is also warmed up to higher temperature by a catalytic reaction at the upstream side. The exhaust gas that has passed through the Pd layer with the Rh layer stacked thereon passes through the Pt layer with the Rh layer stacked thereon. Since the exhaust gas that has reached the Pt layer and the Rh layer is warmed up to even higher temperature, the harmful components including methane are purified from the exhaust gas at a high purification rate while passing through the Pt layer with Rh layer stacked thereon. With the Rh layer provided, NOx components in the exhaust gas are also purified. Thus, the exhaust gas is discharged from the end portion 10b on an exhaust gas outflow side to outside of the catalyst body 5 with the harmful components removed.

Test examples related to the present invention will be described below, but it is not intended to limit the present invention to the test examples below.

Test Example 1

Example 1

As a carrier, 9.8 g of alumina powder having a specific surface area of 6 $m^2/g$ was prepared, was dispersed in a palladium nitrate aqueous solution adjusted to achieve a Pd supported amount of 0.2 g, is stirred and mixed for 30 minutes, and then is dried by heating at 120° C. for 12 hours. The resulting dry powder was heat-treated at 500° C. for 1 hour to obtain a catalyst material of Example 1 in powder form. Note that this heat treatment temperature of 500° C. is temperature at which phase change, sintering, or the like of alumina do not occur. The catalyst material was pressed at a pressure of 300 kN using a press device, and the resulting product was sieved to adjust the particle diameter to 0.5 to 1.0 mm, thereby providing a catalyst specimen of Example 1.

Example 2

The alumina powder in the carrier in Example 1 was changed to alumina powder having a specific surface area of 20 $m^2/g$, and a catalyst material and a catalyst specimen of Example 2 were prepared in a similar manner to that in Example 1.

Example 3

The alumina powder in the carrier in Example 1 was changed to alumina powder having a specific surface area of 44 $m^2/g$, and a catalyst material and a catalyst specimen of Example 3 were prepared in a similar manner to that in Example 1.

Example 4

The alumina powder in the carrier in Example 1 was changed to alumina powder having a specific surface area of 79 $m^2/g$, and a catalyst material and a catalyst specimen of Example 4 were prepared in a similar manner to that in Example 1.

Example 5

The alumina powder in the carrier in Example 1 was changed to alumina powder having a specific surface area of 90 $m^2/g$, and a catalyst material and a catalyst specimen of Example 5 were prepared in a similar manner to that in Example 1.

Example 6

The alumina powder in the carrier in Example 1 was changed to alumina powder having a specific surface area of 109 $m^2/g$, and a catalyst material and a catalyst specimen of Example 6 were prepared in a similar manner to that in Example 1.

Example 7

The alumina powder in the carrier in Example 1 was changed to alumina powder having a specific surface area of 125 $m^2/g$, and a catalyst material and a catalyst specimen of Example 7 were prepared in a similar manner to that in Example 1.

[TEM Observation of Catalyst Material]

When an X-ray diffraction analysis was performed on the catalyst materials of Examples 1 to 7 prepared in the above-described manner, palladium (Pd) and a palladium oxide (PdO) were detected in addition to alumina as the carrier. Therefore, the catalyst materials of Examples 1 to 7 were observed using TEM, and it was confirmed that a material darker in contrast was supported in a nanoparticle form on the surface of the powdered alumina. Based on these results, it was found that the catalyst materials in Examples 1 to 7 were Pd and/or PdO deposited on the surface of the alumina carrier. It is known that, as for Pd and PdO, for example, due to fluctuations of an atmosphere of exhaust gas, Pd is easily oxidized into PdO, PdO is easily reduced to Pd, and an electronic state of Pd is reversibly changed. For convenience, Pd and/or PdO deposited on the surface of the alumina carrier is occasionally referred to simply as "palladium particles."

(Proportion of Specific Crystal Planes at Interface)

Next, atomic structure images were obtained for the catalyst materials of Examples 1 to 7, and a crystal structure analysis of an interface between the alumina carrier and the palladium particles was performed. Specifically, for the catalyst materials of Examples 1 to 7, eleven or more atomic structure images of the crystal interface between the alumina carrier and the palladium particles were prepared (N=11 or more). The atomic structure images were obtained by adjusting a tilt of a TEM observation sample so that a direction of electron beam incidence was along crystal zone axes of the alumina carrier and the palladium particles. The crystal interface between the alumina carrier and the palladium particles was observed for each of different palladium particles supported by a plurality of alumina particles.

The crystal planes of alumina and palladium at the Pd deposition interface were examined based on the obtained atomic structure images of the interface. In this example, the crystal planes of the Pd deposited interface were examined by measuring a plane spacing between planes parallel to the interface for each of alumina and palladium, and identifying the plane spacing as a plane spacing between the crystal planes of each of alumina and palladium. Based on results of the examination, a proportion of specific crystal planes to a total number of identified crystal planes (N=11 or more) at the interface was calculated for each of alumina and palladium using the following expression: the proportion of specific crystal planes (number %)=(the number of samples in which a crystal plane was a specific crystal plane at an interface)÷(the number of samples in which a crystal plane at an interface was identified)×100. Note the specific crystal planes of alumina were three planes, that is, θ(001), θ(111), and α(104). The specific crystal planes of palladium were two planes, that is, Pd(100) and PdO(101). The results are illustrated in Table 1 below. Note that identification of a junction plane is not limited to that using a plane spacing, and may also be performed by a method using electron beam diffraction.

(Particle Diameter of Palladium Particles)

The particle diameter of the palladium particles deposited on the surface of the alumina carrier was measured together with the examination of the proportion of the specific crystal planes. As the particle diameter of the palladium particles, a value (volume sphere equivalent diameter) calculated from a metal surface area and an amount of palladium obtained using a chemisorption analyzer by a CO pulse method was used. Results of the measurement are illustrated in Table 1 below.

[Evaluation of Methane Purification Performance]

For the catalyst specimens of Examples 1 to 7, the methane purification performance in simulated exhaust gas of a natural gas (CNG) vehicle was examined using a catalyst evaluation device. The catalyst evaluation device includes a mass flow controller, a heating furnace, and an engine exhaust gas analyzer, and can generate gas having a predetermined composition to supply the gas to the catalyst samples and analyze components of inflow gas to the catalyst samples and outflow gas from the catalyst samples. Specifically, 1.0 g of the catalyst specimen of each of Examples 1 to 7 was set in the catalyst evaluation device, and temperature of a set portion of the catalyst specimen was raised from room temperature (25° C.) to 500° C. at a temperature raising rate of 20° C./min while supplying the simulated exhaust gas of the CNG vehicle. Based on a ratio between a methane ($CH_4$) concentration in the inflow gas to the catalyst specimen measured at this time and a methane ($CH_4$) concentration in the exhaust gas, a methane purification rate was continuously measured, and the temperature (50% methane purification temperature: $T_{50\%}$) of the catalyst specimen when the methane purification rate reached 50% was examined. Results of the examination are illustrated in Table 1.

Note that, as the simulated exhaust gas of the CNG vehicle, gas having the following composition was used.

$CH_4$: 4000 ppm
$O_2$: 10 mass %
$H_2O$: 10 mass %
CO: 500 ppm
NO: 500 ppm
$N_2$: Rest

TABLE 1

| | Alumina | | Catalyst | | | | 50% |
|---|---|---|---|---|---|---|---|
| Example | Alumina Amount (g) | Specific Surface Area ($m^2/g$) | Palladium Amount (g) | Body Pd Particle Diameter (nm) | Proportion of Specific Planes (number %) | | Methane Purification Temperature (° C.) |
| | | | | | Pd/PdO | $Al_2O_3$ | |
| 1 | 9.8 | 6 | 0.2 | 33.7 | 36 | 36 | 360.0 |
| 2 | 9.8 | 20 | 0.2 | 10.5 | 44 | 37 | 353.2 |
| 3 | 9.8 | 44 | 0.2 | 7.5 | 54 | 38 | 348.3 |
| 4 | 9.8 | 79 | 0.2 | 6.6 | 25 | 33 | 356.0 |
| 5 | 9.8 | 90 | 0.2 | 6.3 | 20 | 30 | 357.1 |
| 6 | 9.8 | 109 | 0.2 | 5.9 | 15 | 25 | 361.3 |
| 7 | 9.8 | 125 | 0.2 | 5.8 | 7 | 13 | 371.2 |

[Evaluation]
(Palladium Specific Crystal Plane and 50% Methane Purification Temperature)

Figure 4:
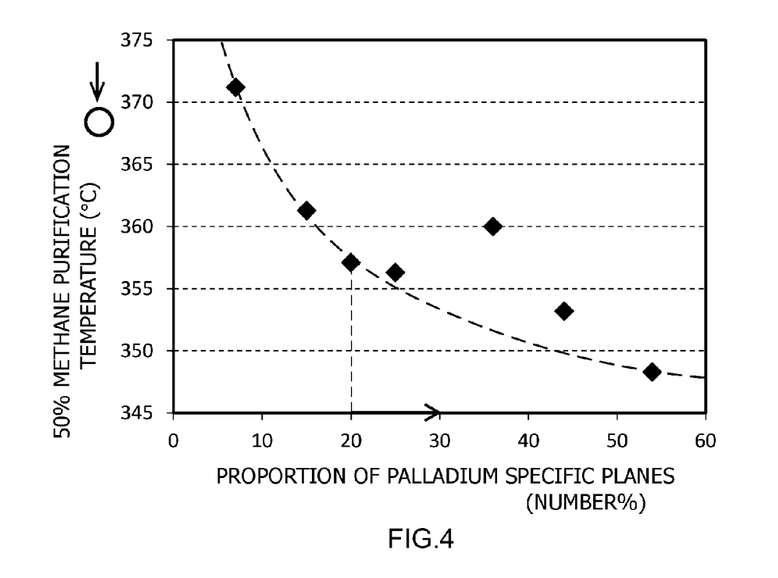
FIG. 4 is a graph illustrating a relationship between a proportion of specific crystal planes of palladium at a catalyst-carrier interface and 50% methane purification temperature for catalyst bodies of examples.
Figure 5:
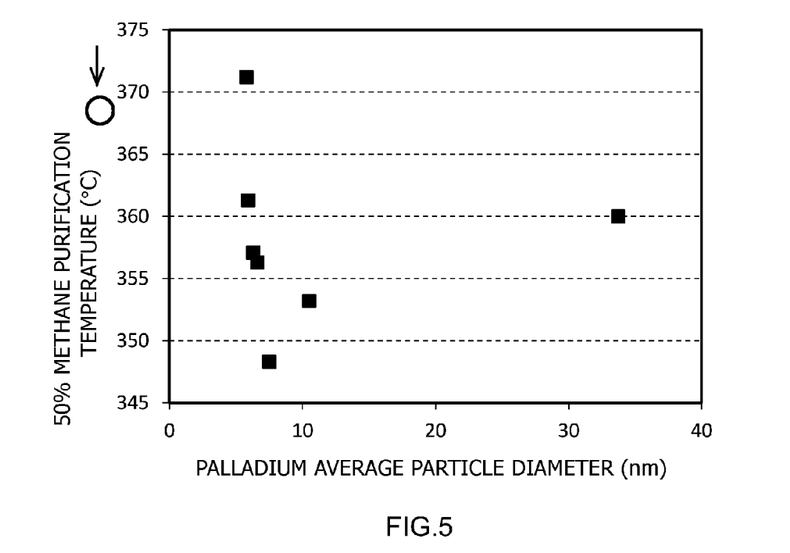
FIG. 5 is a graph illustrating a relationship between an average particle diameter of palladium and 50% methane purification temperature for catalyst bodies of examples.

A relationship between a proportion of the specific crystal planes of the palladium particles at the interface in each of the catalyst materials of Examples 1 to 7 and the 50% methane purification temperature of the catalyst material is illustrated in FIG. 4. A relationship between the average particle diameter of the palladium particles and the 50% methane purification temperature of the catalyst material is illustrated in FIG. 5. As for the 50% methane purification temperature, the lower a value of the 50% methane purification temperature is, the lower the temperature at which a high methane purification performance can be achieved is. As illustrated in FIG. 4, it was found that, generally, there is a tendency the higher the proportion of the specific crystal planes of palladium at the interface of the catalyst material is, the lower the 50% methane purification temperature is. In particular, for the catalyst material of Example 3 in which the proportion of the specific crystal planes is 54 number %, which is the highest, the 50% methane purification temperature was 348.3° C., and is the lowest among those in Examples 1 to 7. However, as illustrated in FIG. 5, it was confirmed that there is no significant relationship between the particle diameter of the palladium particles and the 50% methane purification temperature. However, for the catalyst material of Example 1 in which the average particle diameter of the palladium particles was large and exceeded 30 nm, presumably, because the average particle diameter of the palladium particles was too coarse, the activity efficiency of the catalyst was reduced and the 50% methane purification temperature was increased.

Based on the foregoing, it was found that the palladium particles are supported such that Pd(100) or PdO(101) equivalent to Pd(100) is a crystal growth plane and these planes are parallel to the surface of the carrier, and thus, a higher methane purification performance can be achieved. In other words, it was found that the higher the proportion of the palladium particles grown in a Pd[100] orientation or a PdO[101] orientation equivalent to the Pd[100] orientation relative to the carrier, the higher the methane purification performance is. In addition, it can also be said that the methane purification performance is higher when the palladium particles are not too coarse (for example, have an average particle diameter of about 30 nm or less, preferably about 20 nm or less). In this test example, it can be said that the palladium particles preferably have, for example, an average particle diameter of 20 nm or less and the proportion of the specific crystal planes at the interface is about 20 number % or more because the 50% methane purification temperature is below 360° C. and the methane purification performance is increased.

Figure 6:
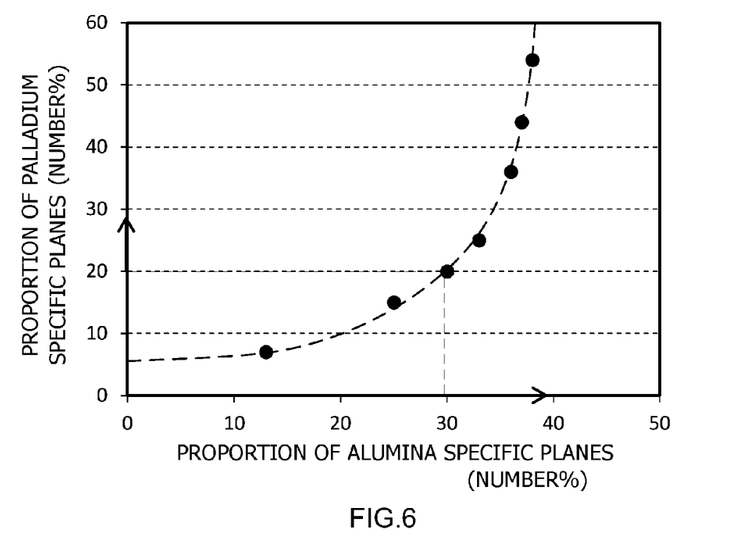
FIG. 6 is a graph illustrating a relationship between a proportion of specific crystal planes of palladium and a proportion of specific crystal planes of alumina at a catalyst-carrier interface for catalyst bodies of examples.

Next, a relationship between the proportion of the specific crystal planes of the palladium particles at the interface in each of the catalyst materials of Examples 1 to 7 and a proportion of the specific crystal planes of the alumina carrier at the interface of the catalyst material is illustrated in FIG. 6. As illustrated in FIG. 6, it was found that there is a very good correlation between the proportion of the specific crystal planes of the palladium particles at the interface of the catalyst material and the proportion of specific crystal planes of the alumina carrier. Moreover, in this test example, for example, palladium particles in which an interface that contribute to reduction in the 50% methane purification temperature was a specific crystal plane were present in various proportions ranging from 7 number % (Example 7) to 54 number % (Example 3) of the palladium particles in the catalyst material, and it was found that, as the proportion of the specific crystal planes of alumina serving as the carrier increases, a proportion at which palladium particle growth planes formed thereon are specific crystal planes increases. In other words, it was found that the palladium particles that contribute to reduction in the 50% methane purification temperature are likely to be formed on the specific crystalline planes of the alumina carrier. Based on the foregoing, it can be said that the palladium particles grown on the crystalline alumina carrier exhibit epitaxy, and the more any one of θ(001), θ(111), and α(104) that are the specific crystal planes is exposed on the surface of the alumina carrier, the more likely it is that the crystal growth planes of palladium crystally grown on the surface can be made Pd(100) or PdO(101) and a growth direction thereof can be coordinated to be a specific direction, that is, Pd[100] or PdO[101] equivalent to the Pd[100], so that a catalyst material having a higher methane purification performance can be realized. In this test example, for example, in order to make the proportion of palladium particles growing on specific planes to be approximately 20 number % or more, it is preferable that the proportion of the specific crystal planes at the interface of alumina serving as the carrier is 30 number % or more.

Figure 7:
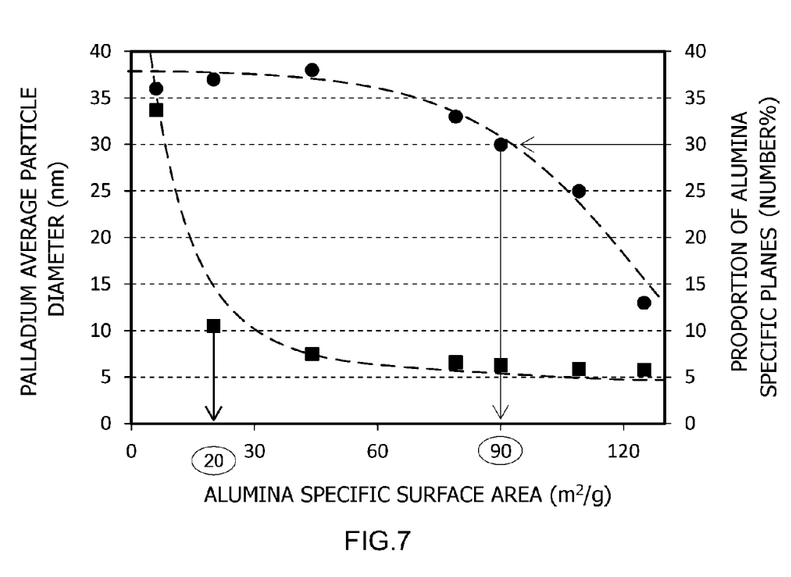
FIG. 7 is a graph illustrating a relationship between an average particle diameter of palladium, a proportion of specific crystal planes of alumina, and a specific surface area of alumina for catalyst bodies of examples.

In order to confirm properties of the alumina carrier in more detail, the average particle diameter of the palladium particles in each of the catalyst materials of Examples 1 to 7 and the proportion of the specific crystal planes at the interface of the alumina carrier are illustrated in FIG. 7 in a relationship with the specific surface area of alumina. As illustrated in FIG. 7, it was found that the average particle diameter of the palladium particles generally exhibits a constant correlation with the specific surface area of alumina. That is, it was found that there is a tendency that the larger the specific surface area of alumina is, the smaller the average particle diameter of the palladium particles formed on the surface thereof is. For example, for the catalyst materials of Examples 1 to 7, it is understood that the specific surface area of alumina may be approximately 10 $m^2/g$ or more in order to cause the average particle diameter of the palladium particles to be smaller than 30 nm, and it is also understood that the specific surface area of alumina may be made approximately 15 $m^2/g$ or more in order to cause the average particle diameter to be approximately 20 nm or less and may be made approximately 20 $m^2/g$ or more in order to stably cause the average particle diameter to be 15 nm or less.

As illustrated in FIG. 7, it was found that the proportion of specific crystal planes at the interface of the alumina carrier generally exhibits a constant correlation with the specific surface area of alumina. That is, it was found that there is a tendency that the smaller the specific surface area of alumina is, the higher the proportion of a surface on which an alumina specific interface is exposed and palladium particles are oriented and deposited is. It was found that there is a tendency that the proportion of the alumina specific interface in the palladium particle deposited surface increases linearly as the specific surface area reduces in a range in which the specific surface area of alumina is approximately 80 $m^2/g$ or more and, on the other hand, converges to a certain ratio in a range in which the specific surface area of alumina is approximately 80 $m^2/g$ or less. For example, for the catalyst materials of Examples 1 to 7, in order to cause the proportion of specific crystal planes at the interface of the alumina carrier to be approximately 30 number % or more to achieve palladium particles growing at the specific interface at approximately 20 number % or more, the specific surface area of alumina may be approximately 90 $m^2/g$ or less.

Based on the foregoing, it is preferable that the specific surface area of alumina serving as the carrier is 20 $m^2/g$ or more and 90 $m^2/g$ or less because a catalyst material in which the proportion of the palladium particles that contribute to reduction in the 50% methane purification temperature is high can be obtained.

Test Example 2

Example 1

In a similar manner to that in Example 3 of Test Example 1 described above, the catalyst material and the catalyst specimen of Example 3 were prepared.

Example 8

Except that the Pd content of the palladium nitrate aqueous solution and the amount of alumina powder (having a specific surface area of 44 $m^2/g$) added in Example 3 of Test Example 1 described above were changed to 1.0 g and 9.0 g, respectively, in a similar manner to that in Example 3, a catalyst material and a catalyst specimen of Example 8 were prepared. A supported ratio of palladium particles (catalyst) in the catalyst material of this Example 8 is 10 mass %.

Example 9

Except that the Pd content of the palladium nitrate aqueous solution and the amount of alumina powder (having a specific surface area of 44 m²/g) added in Example 3 of Test Example 1 described above were changed to 1.5 g and 8.5 g, respectively, in a similar manner to that in Example 3, a catalyst material and a catalyst specimen of Example 9 were prepared. A supported ratio of palladium particles (catalyst) in the catalyst material of this Example 9 is 15 mass %.

Example 6

In a similar manner to that in Example 6 of Test Example 1 described above, the catalyst material and the catalyst specimen of Example 6 were prepared.

Example 10

Except that the Pd content of the palladium nitrate aqueous solution and the amount of alumina powder (having a specific surface area of 109 m²/g) added in Example 6 of Test Example 1 described above were changed to 1.0 g and 9.0 g, respectively, in a similar manner to that in Example 6, a catalyst material and a catalyst specimen of Example 10 were prepared. A supported ratio of palladium particles (catalyst) in the catalyst material of this Example 10 is 10 mass %.

Example 11

Except that the Pd content of the palladium nitrate aqueous solution and the amount of alumina powder (having a specific surface area of 109 m²/g) added in Example 6 of Test Example 1 described above were changed to 1.5 g and 8.5 g, respectively, in a similar manner to that in Example 6, a catalyst material and a catalyst specimen of Example 11 were prepared. A supported ratio of palladium particles (catalyst) in the catalyst material of this Example 11 is 15 mass %.

[TEM Observation of Catalyst Material]
(Proportion of Specific Crystal Planes at Interface)

When an X-ray diffraction analysis was performed on the catalyst materials of Examples 3, 6, and 8 to 11 prepared, palladium (Pd) and a palladium oxide (PdO) were detected in addition to alumina as the carrier. Therefore, for the catalyst materials of Examples 3, 6, and 8 to 11 were observed using TEM, and it was confirmed that the palladium particles were deposited and supported on the surface of alumina particles as the carrier. Then, for the catalyst materials of Examples 3, 6, and 8 to 11, atomic structure images of the alumina-palladium interface were obtained by TEM observation and, for each of alumina and palladium, a proportion of specific crystal planes to a total number (N=11 or more) of the alumina-palladium interfaces at which crystal planes were identified was calculated in a similar manner to that in Test Example 1 described above, and results of the calculation are illustrated in Table 2. Note that the specific crystal planes of alumina were three planes, that is, $\theta(001)$, $\theta(111)$, and $\alpha(104)$. The specific crystal planes of palladium were two planes, that is, Pd(100) and PdO(101).

(Particle Diameter of Palladium Particles)

For the catalyst materials of Examples 3, 6, and 8-11 prepared, the particle diameter of the palladium particles deposited on the surface of the alumina carrier was measured together with the examination of the proportion of the specific crystal planes in a similar manner to that in Example 1. Results of the measurement are illustrated in Table 2 below.

[Evaluation of Methane Purification Performance]

For the catalyst materials of Examples 3, 6, and 8 to 11 prepared, the methane purification performance in simulated exhaust gas of a CNG vehicle was examined under similar conditions to those in Test Example 1. Temperature (50% methane purification temperature: $T_{50\%}$) of each of the catalyst specimens when the methane purification rate reached 50% was examined, and results of the examination are illustrated in Table 2 below.

TABLE 2

| | Alumina | | Catalyst Body | | | | 50% | |
|---|---|---|---|---|---|---|---|---|
| | Alumina | Specific Surface | Palladium | Pd Particle | Pd Supported | Proportion of Specific Planes (number %) | | Methane Purification | " Reduction |
| Example | Amount (g) | Area (m²/g) | Amount (g) | Diameter (nm) | Rate (mass %) | Palladium Particles | Alumina | Temperature (° C.) | Temperature (° C.) |
| 3 | 9.8 | 44 | 0.2 | 7.5 | 2.0 | 54 | 38 | 348.3 | 0 |
| 8 | 9.0 | 44 | 1.0 | 13.8 | 10 | 37 | 38 | 310.5 | −37.8 |
| 9 | 8.5 | 44 | 1.5 | 22.1 | 15 | 15 | 25 | 306.0 | −42.3 |
| 6 | 9.8 | 109 | 0.2 | 5.9 | 2.0 | 15 | 25 | 361.3 | 13 |
| 10 | 9.0 | 109 | 1.0 | 11.3 | 10 | 18 | 25 | 315.1 | −33.2 |
| 11 | 8.5 | 109 | 1.5 | 18.4 | 15 | 14 | 25 | 305.0 | −43.3 |

[Evaluation]

Figure 8:
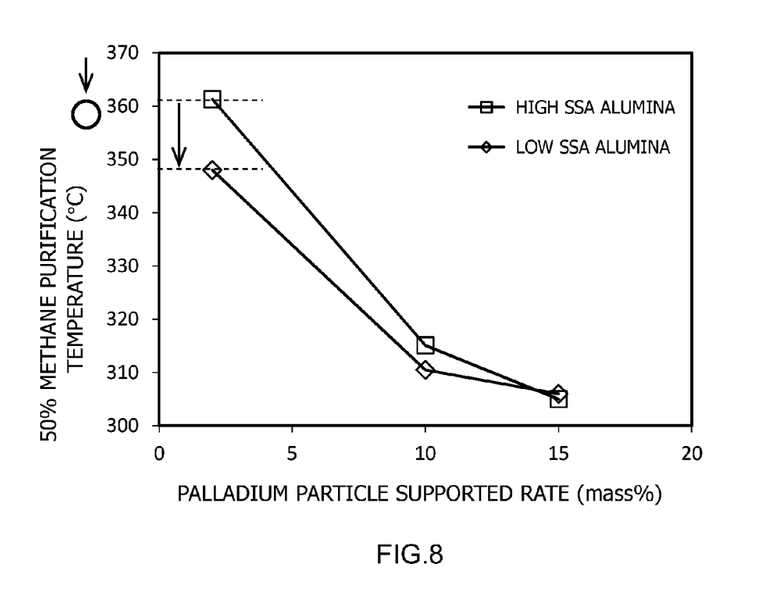
FIG. 8 is a graph illustrating a relationship between a palladium supported ratio and 50% methane purification temperature for catalyst bodies of examples.

A relationship between a palladium supported amount of each of the catalyst materials and the 50% methane purification temperature is illustrated in FIG. 8. It can be understood that, in each of Examples 3, 8, and 9 using alumina having a relatively small specific surface area as a carrier and Examples 6, 10, and 11 using alumina having a relatively large specific surface area, by increasing a palladium supported ratio of the catalyst material, the 50% methane purification temperature can be lowered and the catalyst material having a high methane purification performance can be obtained. In comparison between Example 9 and Example 11 in which the supported ratio of palladium particles is 15 mass %, as illustrated in FIG. 8, the 50% methane purification temperature is lower in Example 11 in which the specific surface area of alumina of the carrier is larger. However, in Examples 3, 8, 6, and 10 in which the supported ratio of the palladium particles is even lower, a reverse phenomenon that the 50% methane purification temperature is lower in Example 3 and Example 8 in which the specific surface area of alumina is smaller was observed. Moreover, it was also found that, as the supported ratio of the palladium particles reduces, a difference in the 50% methane purification temperature between the catalyst materials having the same supported ratio of palladium particles increases and, for example, for the catalyst materials of Example 3 and Example 6 in which the supported ratio is 2 mass %, the 50% methane purification temperature is lower by 13° C. in the catalyst material of Example 3 having a specific surface area of 44 m²/g than in the catalyst material of Example 6 having a specific surface area of 109 m²/g.

Based on the foregoing, it can be said that, for example, in order to achieve 50% methane purification temperature (about 42° C. to 43° C.) that is similar to those of the catalysts of Example 9 and Example 11 in which the palladium supported ratio is 15%, for example, the catalyst material of Example 3 in which the palladium supported ratio is 2%, which is disclosed herein, may be used in about three times the amount. That is, it was found that an amount of palladium required to achieve a predetermined 50% methane purification temperature can be significantly reduced, for example, to 4/10.

Specific examples of the present invention have been described in detail above, but these are merely examples and do not limit the scope of the claims. The technology described in the scope of the claims includes various modifications and changes of the specific examples described above.

For example, in the above-described embodiment, a catalyst material containing only palladium was used as the methane purification catalyst, but there is no particular limitation on an embodiment of the methane purification catalyst. For example, in addition to the catalyst containing only palladium, a catalyst material containing rhodium, a catalyst material containing platinum, a catalyst material containing rhodium and platinum, or the like may be used. Alternatively, a catalyst material containing only palladium and a catalyst material containing some other catalyst than palladium may be used together.

Moreover, for example, in the above-described embodiment, the internal combustion engine is a CNG engine, but the internal combustion engine provided in combination with a catalyst may be a gasoline engine, a diesel engine, or the like, as long as the engine is used for the purpose of purification of methane. Furthermore, these internal combustion engines may be engines mounted on hybrid vehicles which include a vehicle driving power source.

The invention claimed is:

1. A catalyst material used for purifying methane, comprising:
   a carrier formed of alumina; and
   a catalyst formed of at least one of palladium and a palladium oxide directly supported by the carrier,
   wherein
   a specific surface area of the carrier is 20 m²/g or more and 44 m²/g or less, and
   an average particle diameter of the carrier based on a volume-based particle diameter distribution measured by a laser diffraction scattering method is 1 μm or more and 20 μm or less.

2. The catalyst material according to claim 1, wherein a proportion of Pd(100) and PdO(101) in crystal planes of the catalyst at a joint surface between the catalyst and the carrier is 40 number % or more.

3. The catalyst material according to claim 1, wherein a proportion of θ(001), θ(111), and α(104) in crystal planes of the carrier at a joint surface between the catalyst and the carrier is 35 number % or more.

4. The catalyst material according to claim 1, wherein an average particle diameter of the catalyst is 20 nm or less.

5. The catalyst material according to claim 1, wherein a supported ratio of the catalyst to a total amount of the carrier and the catalyst is 10 mass % or less.

6. The catalyst material according to claim 1, wherein the catalyst material is used for purifying exhaust gas emitted from an internal combustion engine using natural gas as fuel.

7. The catalyst material according to claim 2, wherein a proportion of θ(001), θ(111), and α(104) in crystal planes of the carrier at a joint surface between the catalyst and the carrier is 35 number % or more.

8. The catalyst material according to claim 2, wherein an average particle diameter of the catalyst is 20 nm or less.

9. The catalyst material according to claim 2, wherein a supported ratio of the catalyst to a total amount of the carrier and the catalyst is 10 mass % or less.

10. The catalyst material according to claim 3, wherein an average particle diameter of the catalyst is 20 nm or less.

11. The catalyst material according to claim 3, wherein a supported ratio of the catalyst to a total amount of the carrier and the catalyst is 10 mass % or less.

12. The catalyst material according to claim 4, wherein a supported ratio of the catalyst to a total amount of the carrier and the catalyst is 10 mass % or less.

13. The catalyst material according to claim 1, wherein alumina forming the carrier is α-alumina.

14. The catalyst material according to claim 1, wherein the catalyst material is a powder.

* * * * *